United States Patent [19]

Scheer et al.

[11] Patent Number: 4,851,932

[45] Date of Patent: Jul. 25, 1989

[54] ADAPTIVE COMPENSATION CIRCUIT FOR MOVING DATA STORAGE MEDIA

[75] Inventors: Arnold C. Scheer, Boulder; Joe K. Jurneke, Fed. Hgts, both of Colo.

[73] Assignee: Storage Technology Corporation, Louisville, Colo.

[21] Appl. No.: 150,061

[22] Filed: Jan. 29, 1988

[51] Int. Cl.$^4$ .............................................. G11B 5/09
[52] U.S. Cl. ......................................... 360/51; 360/46
[58] Field of Search ............................ 360/46, 51, 67; 375/120; 331/1 A

[56] References Cited

U.S. PATENT DOCUMENTS

| | | | |
|---|---|---|---|
| 3,944,940 | 3/1976 | Desai | 329/122 |
| 4,009,490 | 2/1977 | Fassbender | 360/45 |
| 4,055,814 | 10/1977 | Abraham | 331/1 A |
| 4,281,356 | 7/1981 | Sousa | 360/45 |
| 4,519,086 | 5/1985 | Hull | 375/120 |
| 4,534,044 | 8/1985 | Funke | 375/120 |
| 4,577,241 | 3/1981 | Wilkinson | 360/51 |
| 4,607,296 | 8/1986 | Smidth | 360/51 |
| 4,620,300 | 10/1986 | Ogawa | 369/33 |
| 4,644,420 | 2/1987 | Buchan | 360/51 |
| 4,672,482 | 6/1987 | Troletti | 360/45 |
| 4,672,597 | 6/1987 | Yamazaki | 369/59 |
| 4,714,968 | 12/1987 | Troletti | 360/51 |

*Primary Examiner*—Vincent P. Canney
*Attorney, Agent, or Firm*—Dorr, Carson, Sloan & Peterson

[57] ABSTRACT

The optimum processing of magnetically or optically recorded data to recover recorded data bits and clocking information should include apparatus to compensate for variations in media velocity during writing and reading of the media. The adaptive velocity compensation circuit accomplishes this result by sampling the media velocity and comparing the sample to a reference velocity usng a digital tachometer. The result of this comparison is used to control a variable pulsewidth single shot which adjusts the operation of a phase locked loop phase detector to match the velocity of the moving media.

7 Claims, 4 Drawing Sheets

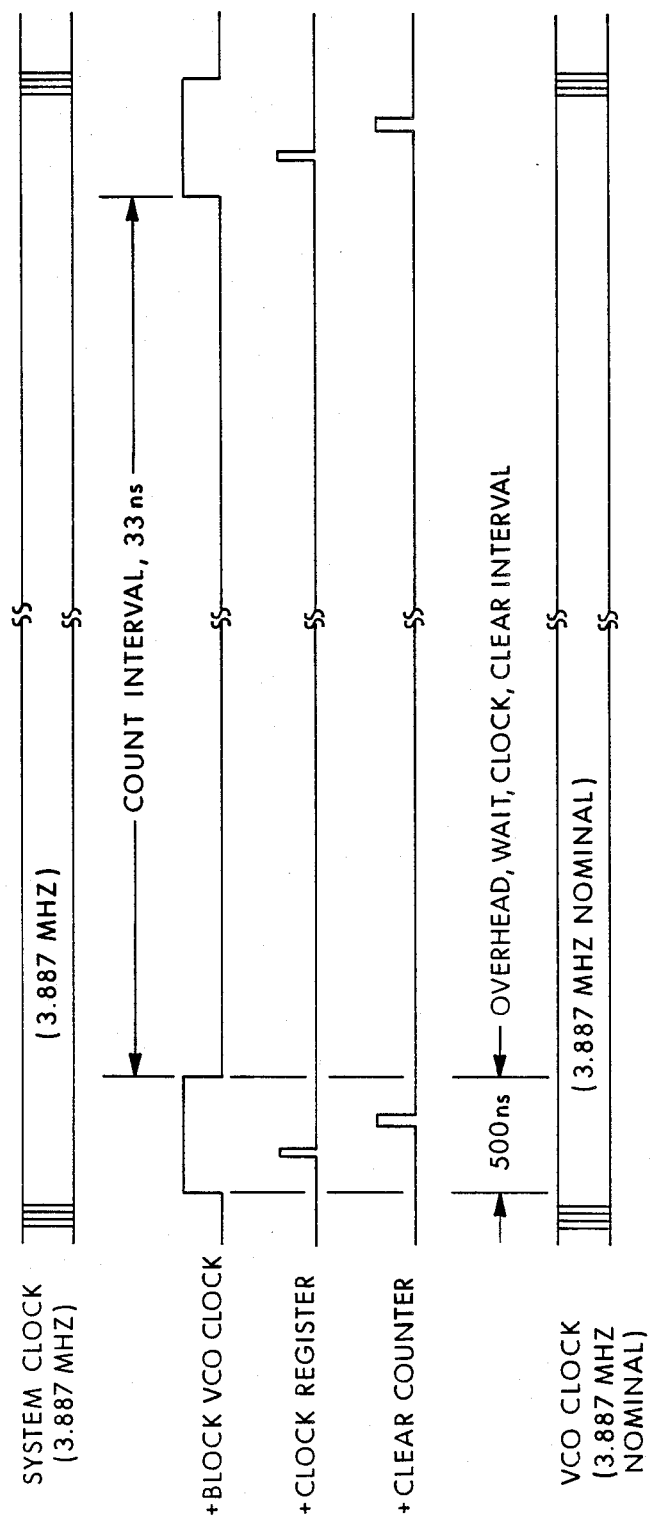

ADAPTIVE COMPENSATION CIRCUIT FOR MOVING DATA STORAGE MEDIA

FIELD OF THE INVENTION

This invention relates to data storage media systems and, in particular, to an adaptive velocity compensation circuit which detects and compensates for any variations in the speed of the moveable data storage media as it affects the synchronous detection of read/write data.

PROBLEM

It is a problem in data storage systems to read and write data on a moving media without having the accuracy of the data adversely affected by variations in the velocity of the moving media. Data storage systems include magnetic tape, floppy disk systems and optical disks, all of which store data along with clocking signals as a self-clocked serial data stream on individual tracks of the storage media. In this arrangement bit cells are not physically delimited on the storage media but are defined relative to one another. In various run-length-limited codes, a data bit is written into the center of a bit cell if the data is equal to a binary 1 and no data bit is written into the bit cell if the data is equal to a binary 0.

In reading and writing data in such a system it is necessary to synchronize the operation of the data recovery circuit to the input data pulses read from the data storage media in order to distinguish between adjacent bit cells. Due to variations caused by media velocity fluctuations, noise, read amplifier inaccuracies and other variations in the control circuitry, the input data pulses read from the data storage media drift from the nominal position in the center of the bit cell. Thus, a means must be used to achieve synchronization between the frequency of the read clock and the actual frequency of the bit cells on the moving data storage media.

It is generally known to employ phase locked loop (PLL) circuitry to synchronize the reading and writing of data with occurrence of the bit cells on the moving data storage media. The phase locked loop receives the input data pulses read from the data storage media and produces a clock signal which is synchronized, that is phase locked, to the data transitions in the input data pulses. The phase locked loop includes a voltage controlled oscillator (VCO), a phase detector, and filter. The output of the voltage controlled oscillator is a clock signal that is used to detect the data, that is, to create a replica of the originally recorded signal. The presence of 1 bits found in the input data stream is used to control the frequency and phase of the voltage controlled oscillator. A problem with the existing non-adaptive phase locked loop circuits is that their fixed phase detectors must accommodate all variations in the stiming of the input data pulses including velocity. Where the variation in the velocity of the moving media represents a significant percentage of the bit cell time, this existing synchronization arrangement reduces the capability of the phase locked loop to compensate for other variations in the input data pulse timing.

SOLUTION

This problem is solved and a technical advance achieved in the art by the subject adaptive velocity compensation circuit for moving media. The adaptive velocity compensation circuit accurately and simply determines and compensates for any variations in the velocity of the moving data storage media. The adaptive velocity compensation circuit is placed in series with the well known existing phase locked loop compensation circuitry to provide precompensation.

A media velocity is determined by a digital tachometer which compares the phase locked loop voltage controlled oscillator output frequency with the system clock reference frequency to produce an indication of the deviation from the nominal media velocity. This deviation reference is used to produce an electrical current which is directly proportional to the media velocity, which current controls a variable pulsewidth single shot circuit. The output pulsewidth of the single shot varies directly proportional to the media bit cell period and is used to define the early and late phase correction periods. Since a by product of this type of phase locked loop is data separation balanced early and late phase correction periods are essential for the optimum cell assignment of one data bits during data detection. Thus, the voltage controlled oscillator is kept in synchronization with the moving media bit cell and the velocity variation contribution is removed from the error budget.

In this fashion, the digital tachometer and variable pulsewidth single shot compensate for variations in the velocity of the moving media so that the input data pulses as presented to the existing phase locked loop circuitry are proportional to the bit cell widths of the moving media. Such an arrangement enables the phase locked loop circuitry to compensate for all other synchronization variations. An advantage of this arrangement is that the velocity of the moving media, as evident in the frequency of the voltage controlled oscillator, is compared to a nominal frequency from the system clock reference so that a reference independent of the actual media drive is available. This eliminates the problem of cumulative error contributions caused by velocity tolerance variations in a particular data storage media drive used for reading a data storage media adding to the velocity tolerance variation found in a different data storage media drive used for write purposes.

An additional advantage of this adaptive velocity compensation circuit is that the accuracy and resolution of the digital tachometer is precisely controlled by choosing the number of bits in the counter, register and digital to analog converter. The digital tachometer output furthermore can be easily interfaced with the variable pulsewidth single shot which converts this output to an accurate pulsewidth as a function of media velocity. The adaptive velocity compensation circuit can thereby accurately track media data velocity variations of 100% of nominal velocity.

BRIEF DESCRIPTION OF THE DRAWING

FIG. 4 is a timing diagram of various clock signals of the adaptive velocity compensation circuit.

DETAILED DESCRIPTION

Figure 1:
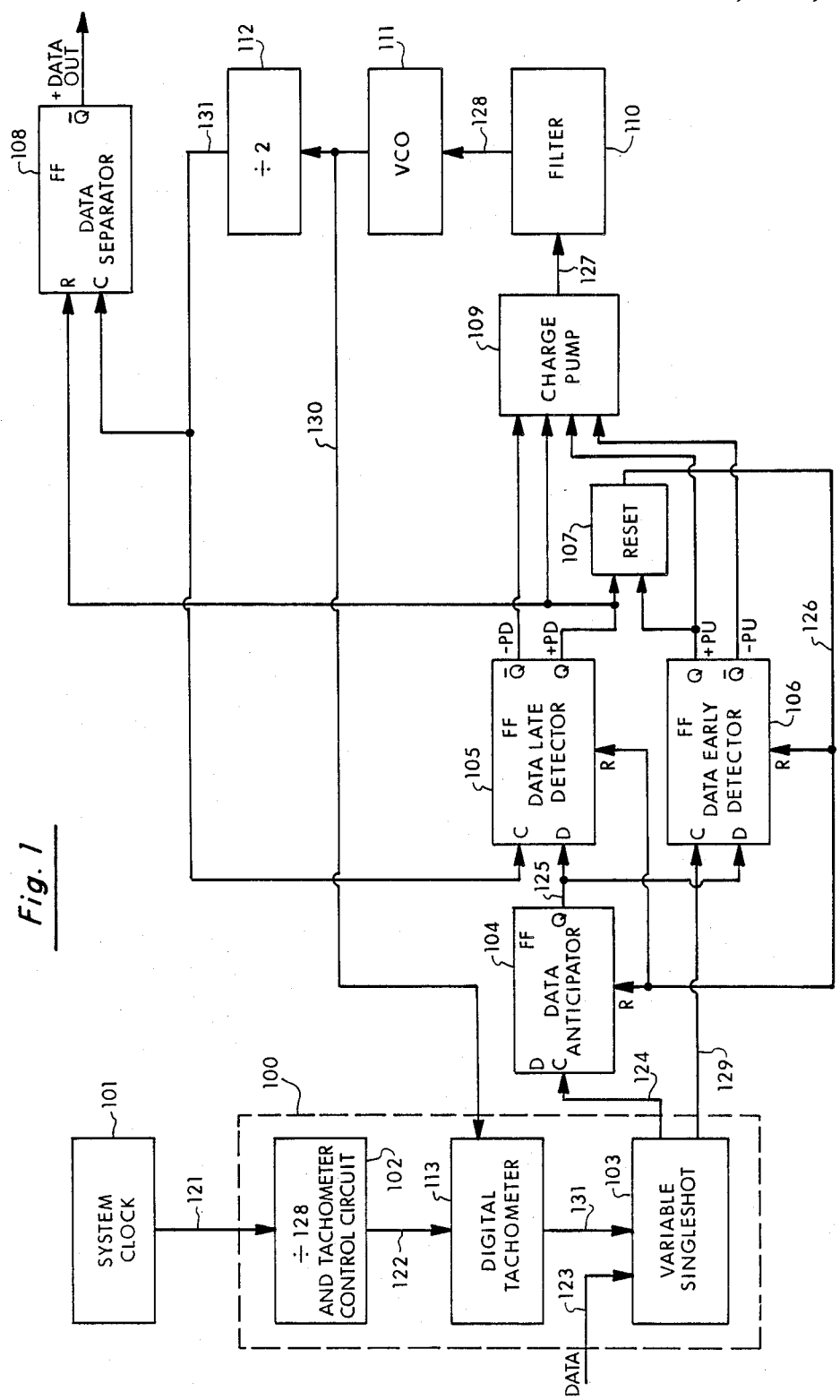
FIG. 1 is a block diagram of the adaptive velocity compensation circuit for moving media.

FIG. 1 is a block diagram of the adaptive velocity compensation circuit of the preferred embodiment of the present invention. The preferred embodiment illustrated in FIG. 1 is for a data read circuit for a moving data storage media, such as a magnetic tape drive. Analogous circuitry would be used for a data write circuit for a magnetic tape drive. The adaptive velocity compensation circuit is shown delimited from the other circuitry by dotted line box 100. This adaptive velocity compensation circuit 100 is interposed between DATA input lead 123 which carries input data pulses from the moving media read heads to the phase locked loop circuitry elements 104 to 112. These elements 104 to 112 are the existing phase locked loop timing synchronization and data separator circuitry.

The operation of the circuitry is explained in two parts. The first section is a description of the well known phase locked loop data synchronization circuitry. The phase locked loop receives the input data pulses read from the data storage media and produces a clock signal which is synchronized, that is frequency and phase locked, to the data transitions in the input data pulses. The phase locked loop includes a voltage controlled oscillator (VCO), phase detector, and filter. The output of the voltage controlled oscillator is a clock signal that is used to detect the data, that is, to create a replica of the originally recorded signal. The presence of 1 bits found in the input data pulses is used to control the frequency of the voltage controlled ascillator.

Figure 2:
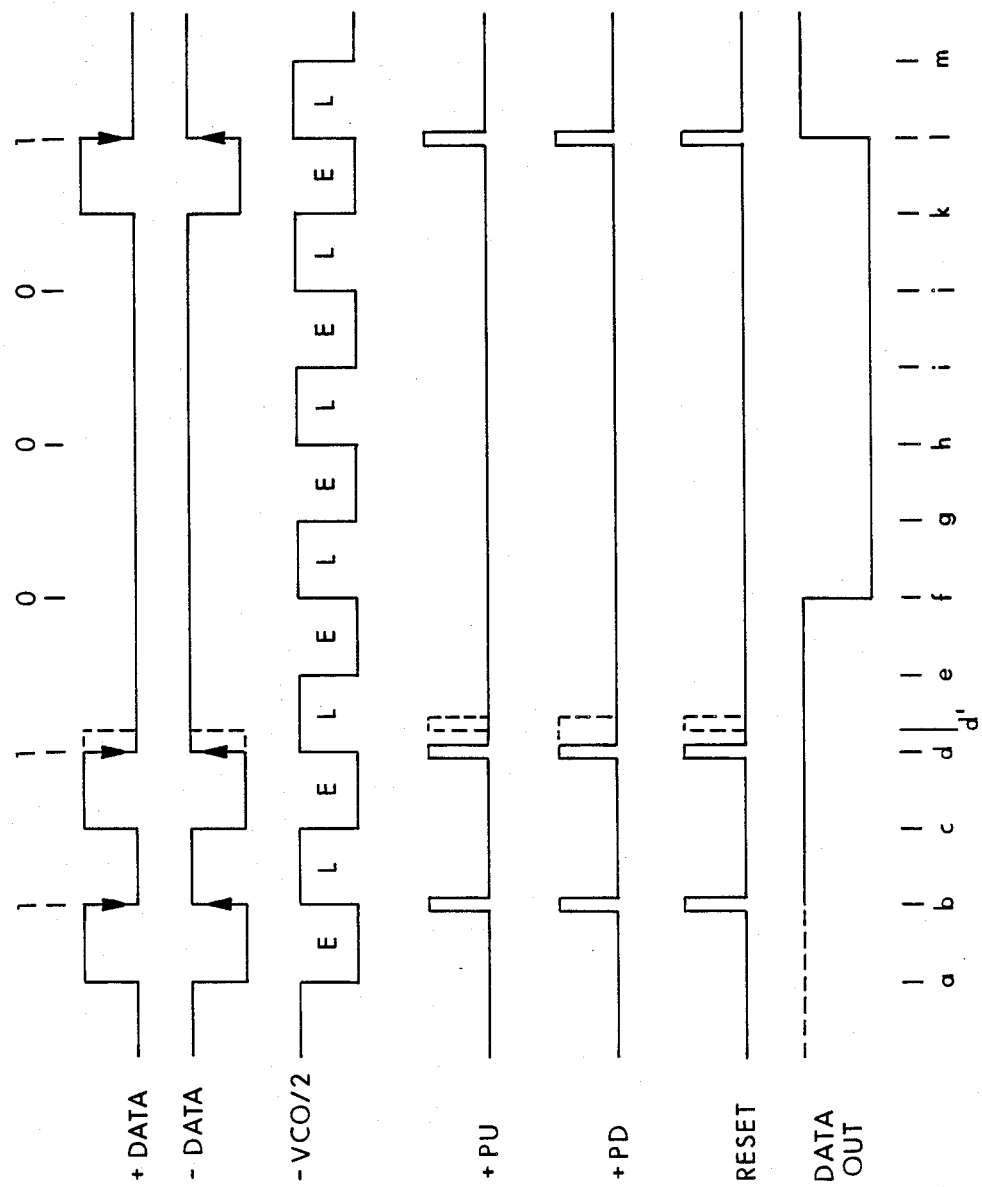
FIG. 2 is a timing diagram of the adaptive velocity compensation circuit, FIGS. a-m included.

In operation, this existing circuitry receives an input data pulse which would appear on DATA lead 123 as a direct input to data anticipator 104 and the inverted input data pulse as an input to data early detect 106. In order to ease the understanding of the description of the circuitry of FIG. 1, a timing diagram is illustrated in FIGS. 2 and 4 to show the wave shapes and timing of the signals of interest in the circuit in FIG. 1. The time interval illustrated in FIG. 2 comprises six bit periods. Each bit period consists of three portions: an initial boundary or leading edge, a midpoint, and a trailing edge or end boundary. Each of these boundaries or points is represented by one of letters a–m shown on FIG. 2. The leading edge of the first bit period is represented by the letter a and the midpoint of that bit period is represented by the letter b. The trailing edge of the first bit period is also the leading edge of the second bit period and is represented by the letter c. From FIG. 2 it can be seen that the letters b, d, f, h, j and 1 represent the midpoints of the bit periods containing either ones or zeros while the remaining letters represent the leading and trailing edges of adjacent bit periods. The data pattern shown in FIG. 2 is a 1-1-0-0-0-1 bit pattern. For the purpose of this discussion the initial data bit of 1 is shown as precisely timed within the bit period while the second 1 bit is shown as occurring late in the bit period.

The first data bit shown in FIG. 2 occurs with no bit shift, that is the data bit on lead 124 is on time with respect to the output of voltage controlled oscillator divide by 2 circuit 112, which output is shown in FIG. 2 as −vco/2, lead 131. Thus, the first bit is in synchronization with the output of the voltage controlled oscillator divide by 2 circuit 112. Data anticipator 104, in response to the leading edge of the first bit appearing on lead 124 at leading edge a, generates a positive pulse to signify a legal and valid sample pulse coming in on the DATA lead 123. The output of data anticipator 104 is applied by lead 125 to data late detector 105 and data early detector 106. Data early detect circuit 106 generates the leading edge of a pump up pulse as indicated on line +PU in FIG. 2 when a transition occurs in the one bit present on the data line. This pulse is terminated at the midpoint b of the bit period. In similar fashion, data late detector 105 generates a pump down pulse as indicated on line +PD in FIG. 2 beginning at the midpoint of the bit period b and terminates that pulse when the actual transition of the input data pulse 1 bit occurs on the DATA lead 123. In the case of data that is in synchronization with the clock output of voltage control oscillator 111, equal and canceling +PU and +PD pulses are generated. The +PU and +PD pulses are applied over leads +PU and +PD respectively to reset circuit 107. Reset circuit 107 detects the equal and canceling +PU and +PD pulses and, in turn, generates a reset pulse on lead 126 which ends any phase locked loop correction and readies it for the next data bit arriving on input DATA lead 123. The +PD output of data late detect circuit 105 is applied to data separator 108 which, in response to the +PD signal, produces a +DATA OUT pulse which is subsequently terminated by the −vco/2 signal on lead 131 at the end of the bit cell boundary.

Charge pump 109 transforms the pulses appearing on leads +PD and +PU into current pulses which are applied on lead 127 to filter 110 where the current signal is transformed into a voltage. This voltage is applied by filter 110 over lead 128 to voltage controlled oscillator 111 and modifies the frequency produced by voltage controlled oscillator 111. The output of voltage controlled oscillator 111 is applied via lead 130 to divide by 2 circuit 112 to thereby produce a clock signal that is of phase and duration of a one bit data pulse. The output of the divide by 2 circuit 112 is applied over lead 131 to data separator 108 to be used to terminate the data pulse as described above. This above described circuitry operates a well known fashion to provide synchronization between the input data signals and the output of the voltage control oscillator 111. In the case where the input data pulse arrives with an early or late bit shift, as shown in the second bit position in FIG. 2, the +PU or +PD pulses are of longer duration in proportion to the amount that the data bit is early or late respectively. The extra pulse width is used to increase or decrease the input voltage to voltage controlled oscillator 111 to maintain the −vco/2 signal frequency and phase locked to the input data pulses.

This circuitry however does not provide separate compersation for variations in the media velocity. In addition, this circuitry does not provide compensation for variations in media velocity from system to system. Adaptive velocity compensation circuit 100 shown in FIG. 1 interposed between the input DATA lead 123 and the above-described phase locked loop circuitry provides compensation for variations in the velocity of the moving media. This is accomplished by comparing the output of voltage controlled oscillator 111 with the system clock 101 to provide a measurement of the deviation of the actual velocity of the media from the nominal velocity of the media as represented by the frequency of the system clock. This deviation measurement is used to provide a precompensation of the input data signals before these signals are applied to the phase locked loop circuitry. This is accomplished by adaptive velocity compensation circuit 100 dividing the system clock output appearing on lead 121 by 128 in divide by 128 and tachometer control circuit 102 to generate a sampling window which is applied to lead 122. In typical operation, a 33 microsecond sampling window is used. The output of voltage controlled oscillator 111 is applied over lead 130 to digital tachometer 113. Digital tachometer 113 counts the output clock signals of voltage controlled oscillator 111 during the 33 microsecond sampling window, as defined by system clock 101 and divide by 128 and tachometer control circuit 102. At the end of the sampling window, digital tachometer 113 stores the count of the output clock signals of voltage controlled ascillator 111 in a register and converts this count into an analog signal. This analog signal is a current which is used to operate variable pulsewidth single shot 103 produce a pulse whose width is a function of the current applied by digital tachometer 113.

If the velocity of the media is low, the phase locked loop voltage controlled oscillator 111 runs slow and the count stored in digital tachometer 113 is less than the nominal amount. Conversely, at higher media velocities the count stored by digital tachometer 113 is greater than the nominal amount. The width of the pulses produced by variable pulsewidth single shot 103 is determined by the count stored in digital tachometer 113. Therefore, the pulse width is inversely proportional to the current produced by digital tachometer 113 which current is itself inversely proportional to time so that the pulse width time is therefore directly proportional to the clock period of voltage controlled oscillator 111. Thus, an increase in the period of the voltage controlled oscillator 111 due to a slow media velocity results in a proportional increase in the pulse width of the data pulse as produced by variable pulsewidth single shot 103. Therefore, the data pulses input over lead 123 are preconditioned by adaptive velocity compensation circuit 100 to be of a duration which exactly match the velocity of the media as indicated by the output of voltage controlled oscillator 111. The output of adaptive velocity compensation circuit 100 accurately and easily tracks both dynamic and static variations in bit cell periods due to media velocity variations. The phase locked loop and data detection windows are therefore not compromised due to velocity variations and these data detection windows can be used entirely to accommodate other contributes to the read/write error budget such as noise, defects and circuit variations.

Figure 3:
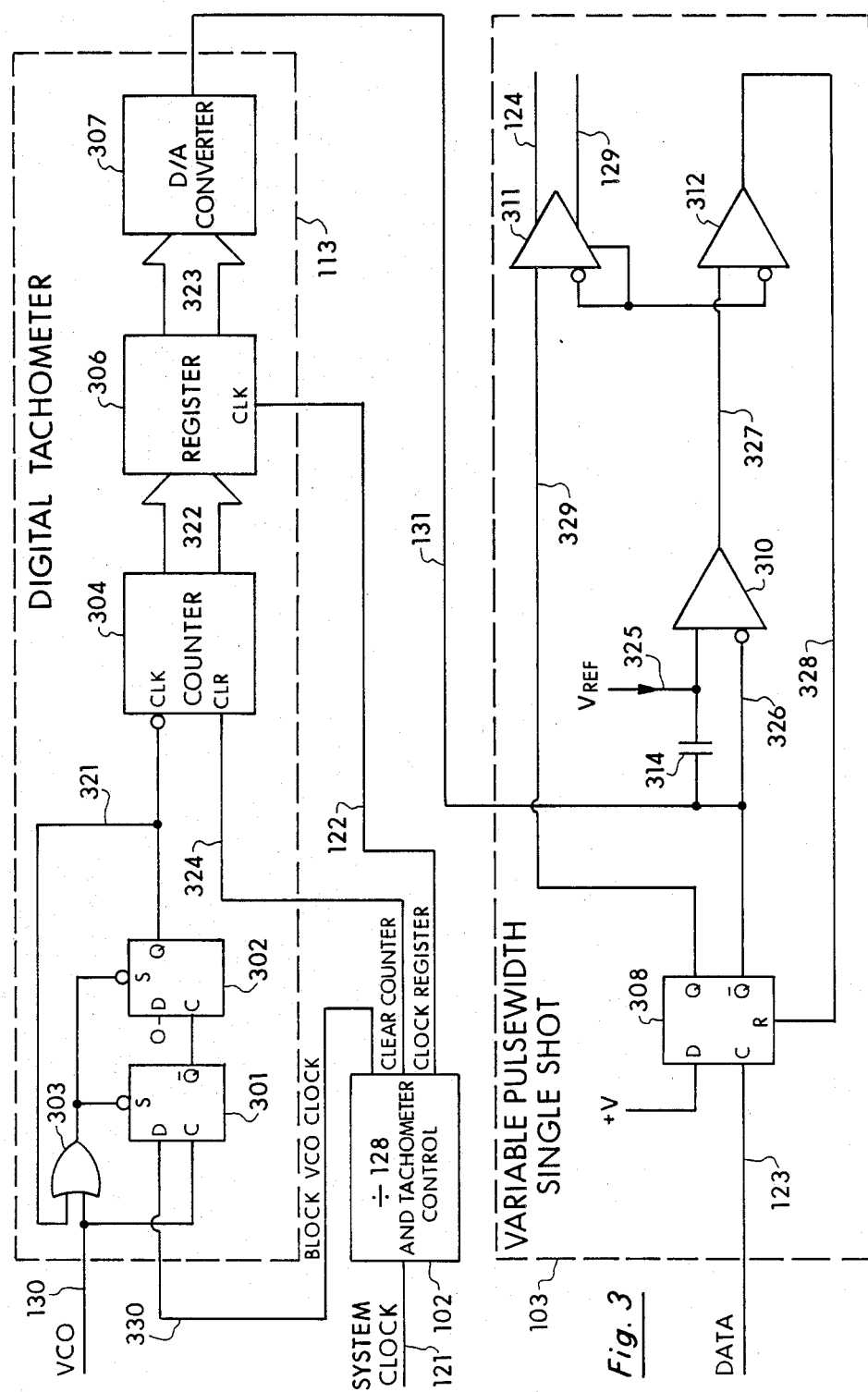
FIG. 3 is a schematic logic diagram of the digital tachometer and the variable single shot circuit.

The circuitry of adaptive velocity compensation circuit 100 is disclosed in additional detail in FIG. 3. As illustrated in block diagram form in FIG. 1, adaptive velocity compensation circuit 100 consists of divide by 128 and tachometer control circuit 102 digital tachometer 113 and variable pulsewidth single shot 103. These elements are shown in more detail in FIG. 3 and only the elements necessary for a general understanding of the circuitry is illustrated in FIG. 3. Thus, pull up resistors, filter capacitors and lead interconnections that are not essential to the understanding of the circuitry have been eliminated from FIG. 3 but are well within the understanding of someone skilled in the art to replicate the function of the circuit illustrated in FIG. 3. Clock pulses from system clock 101 are applied over lead 121 to divide by 128 and tachometer control circuit 102, where the system clock pulses are converted into a 33 microsecond window ending pulse (FIG. 4) which is output on lead 122. The window ending pulse on lead 122 clocks or samples the contents of the counter 304 to the register 306. The control signal on lead 324 is also derived from the divide by 128 and tachometer control circuit 102 and clears the counter 304 prior to the next sample interval. The output clock signal from voltage controlled oscillator 111 is applied to digital tachometer 113 on lead 130. The frequency signal from voltage controlled oscillator 111 is applied to or gate 303 and to flip flops 301, 302 to prevent a race or contention between the clock 321 and the clear 324 from erroneously triggering the counter 304 of digital tachometer 113. Another control signal on lead 330, also derived from the divide by 128 and tachometer control circuit 102 serves to block the processed VCO clock on lead 321 every 33 u.s. while the counter 304 is being sampled and cleared. Aside from the clock, clear contention aspect, elements 301-303 are transparent to the function of the digital tachometer 113. Thus the signal appearing on lead 321 is identical in frequency and wave shape to the signal appearing on lead 130.

Element 304 is a counter which counts the clock pulses that appear on lead 321 during the 33 microsecond window as determined by divide by 128 counter and tachometer control circuit 102. If the velocity of the data storage media is lower than nominal, phase locked loop voltage controlled oscillator 111 runs slower than usual and the count stored in counter 304 is less than 128. Conversely, at higher media velocities, the count produced by voltage controlled oscillator 111 is greater than 128. At the end of the 33 microsecond window, a pulse signal (FIG. 4) is output by divide by 128 counter and tachometer control circuit 102 on lead 122 (clock register). This output pulse is applied to the clock input of register 306 and the count stored in counter 304 is transferred from counter 304 to register 306. Shortly after the occurrence of a clock register pulse on lead 122, a reset or clear counter pulse (FIG. 4) is applied by divide by 128 and tachometer control circuit 102 to lead 324 to reset counter 304. Therefore, the count calculated by counter 304 at the end of the 33 microsecond sample interval is stored in register 306 for the duration of the next sample interval. Register 306 retains the value transferred from counter 304 over leads 322 and outputs the stored count over leads 323 to digital to analog converter 307. The digital to analog converter 307 is an 8 bit device which converts the 8 bits output by register 306 over leads 323 to a negative current which is proportional to the count stored in register 306 and is therefore proportional to the media velocity as measured by the output of voltage controlled oscillator and hence is inversely proportional to the bit time interval period.

Variable pulsewidth single shot 103 has two inputs of interest: the current from digital to analog convertor 307 applied to lead 131 and the input data pulses applied on lead 123. The input data pulses on lead 123 are applied to the clock input of flip flop 308 Which toggles every time there is a transition in the input data pulse from a 0 to a 1 state. The output of flip flop 308 is lead 329 which is one of the inputs to comparator 311, the function of which will be discussed hereinbelow.

The other input to variable pulsewidth single shot 103 is the negative current on lead 131 from digital to analog converter 307. This current draws down capacitor 314 which has been charged by voltage reference Vref. The current charges capacitor 314 from approximately $-0.8$ volts to $-1.5$ volts. The time it takes to discharge capacitor 314 to a fixed voltage threshold is given by $T = CV/i$ where the current i comes from the digital to analog converter 307. When the capacitor 314 is sufficiently charged down, the voltage on lead 326 crosses a fixed threshold in relation to the voltage on lead 325 and comparator 310 triggers, driving output lead 327 high. The high signal on lead 327 causes buffer 312 to generate a reset pulse on lead 328 which resets flip flop 308, therefore clearing the signal output by the flip flop 308 on lead 329. The removal of the flip flop output signal from lead 329 causes comparator 311 to change the state of its outputs. The duration of the signal output by comparator 311 on leads 124 and 129 is determined by the rising edge of the pulse on lead 123 and is terminated by the reset pulse on lead 328, which reset pulse is determined by the time it takes to charge capacitor 314 to a fixed threshold. Therefore, the duration of the signal on leads 124 and 129 is inversely proportional to the current output by digital to analog converter 307 which current magnitude is itself inversely proportional to time so that the pulsewidth time is directly proportional to the period of the voltage controlled oscillator 111. Hence, an increase in the period of voltage controlled oscillator 111 due to slow media velocity results in a commensurate increase in the pulsewidth of the signals output on leads 124 and 129. Thus the pulsewidth of the signals on leads 124 and 129 accurately track dynamic and static variations in bit cell periods due to media velocity variations. The phase locked loop and data detection windows are not compromised due to velocity variations and the data detection windows can be used entirely to accommodate other contributions to the read/write error budget such as noise, defects, etc.

While a specific embodiment of the invention has been disclosed, it is expected that those skilled in the art can and will implement variations of the preferred embodiment disclosed therein, which variations still fall within the scope of the appended claims.

What is claimed is:

1. In a data storage system having a moving media with associated read/write apparatus and a data synchronization circuit having a frequency variable oscillator tuned to the frequency of the data pulses stored on said moving media for recovering and reproducing data pulses stored on said moving media, adaptive velocity compensation apparatus interposed between said read/write apparatus and said data synchronization circuit for compensating for variations in the velocity of said moving media comprising:
    means responsive to a clock signal for generating a periodic timing signal indicative of a nominal framing interval;
    means connected to said data synchronization circuit frequency variable oscillator and responsive to said periodic timing signal and a clock signal produced by said frequency variable oscillator for determining the variation in the moving media velocity from a nominal velocity; and
    means responsive to said determining means for reproducing data pulses received from said read/write apparatus as data pulses having a bit period of frequency to match said moving media velocity.

2. The apparatus of claim 1 wherein said reproducing means comprises:
    pulse generating means responsive to a data pulse received from said read/write apparatus for producing a data pulse of nominal and variable duration; and
    means responsive to said variation determination for adjusting said pulse generating means to vary the duration of said data pulse to match the duration of said bit period.

3. The apparatus of claim 2 wherein said reproducing means comprises a variable pulsewidth single shot.

4. In a data storage system having a moving media with associated read/write apparatus and a data synchronization circuit for recovering and reproducing data pulses stored on said moving media, adaptive velocity compensation apparatus interposed between said read/write apparatus and said data synchronization circuit for compensating for variations in the velocity of said moving media comprising:
    means responsive to a clock signal for generating a periodic timing signal indicative of a nominal framing interval;
    means connected to said data synchronization circuit and responsive to said periodic timing signal for determining the variation in the moving media velocity from a nominal velocity including:
    means responsive to clock signals output by said data synchronization circuit for storing a count of the number of said clock signals received during said nominal framing interval as an indication of media velocity,
    means responsive to said stored count for generating a signal indicative of the variation of said media velocity from said nominal velocity; and
    means responsive to said determining means for reproducing data pulses received from said read/write apparatus as data pulses having a bit period of frequency to match said moving media velocity.

5. The apparatus of claim 4 wherein said determining means comprises a digital tachometer.

6. In a data storage system having a moving media and a voltage controlled oscillator synchronized to the bit frames stored on said media, velocity compensation apparatus comprising:
    means responsive to a clock signal for generating a periodic timing signal indicative of a nominal framing interval;
    means connected to said voltage controlled oscillator and responsive to clock signals output by said voltage controlled oscillator for storing a count of the number of said clock signals generated during said nominal framing interval;
    means connected to said storing means for converting said count to an analog signal whose magnitude is proportional to said count; and
    means responsive to said analog signal and a data pulse read from said moving media for reproducing said data pulse as a pulse whose pulsewidth is controlled by said analog signal to match half said bit frame duration.

7. In a data storage system having a moving media with associated read/write apparatus and a data synchronization circuit for recovering and reproducing data pulses stored on said moving media, a method for compensating for variations in the velocity of said moving media comprising the steps of:
    determining the variation of the moving media velocity from a nominal velocity, including the steps of:
    generating a periodic timing signal indicative of a nominal framing interval,
    comparing said periodic timing signal to clock signals output by said data synchronization circuit,
    determining said variation as a result of said comparison.; and
    reproducing data pulses received from said read/write apparatus as data pulses of duration varying from a nominal duration by an amount equivalent to said determined variation.

* * * * *